T. J. KELLY.
POTATO PLANTER HOPPER.
APPLICATION FILED DEC. 12, 1912.
1,075,040.
Patented Oct. 7, 1913.
2 SHEETS—SHEET 1.
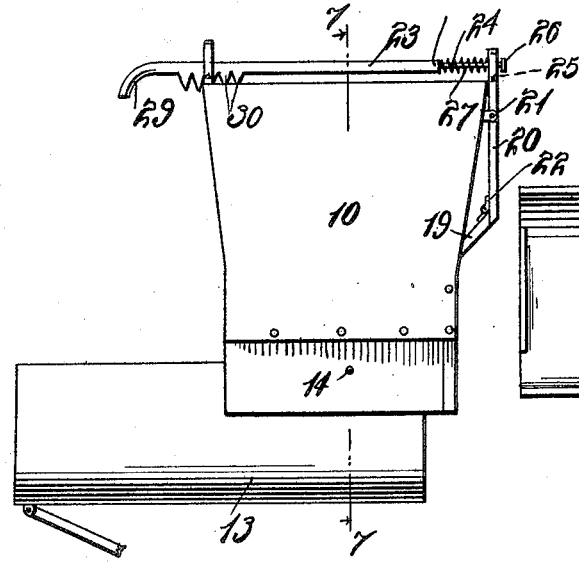
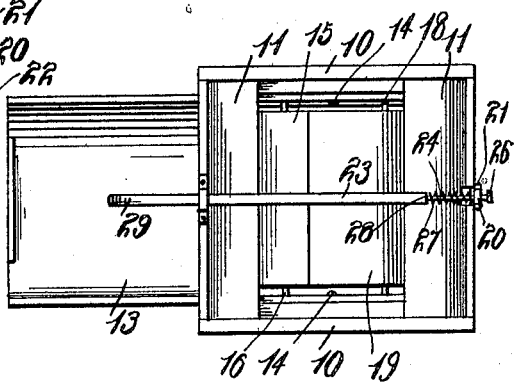
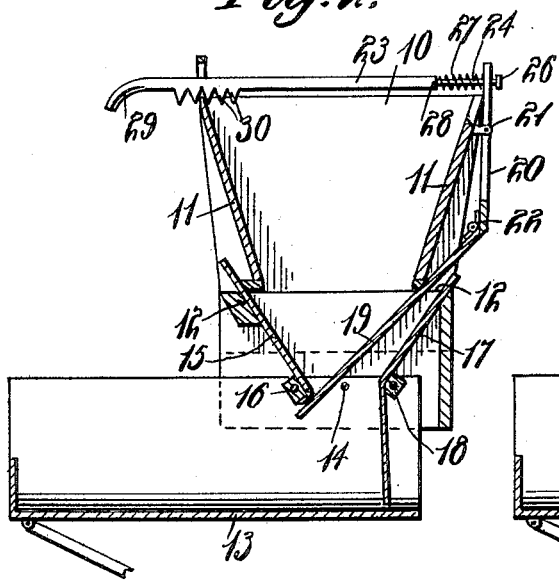
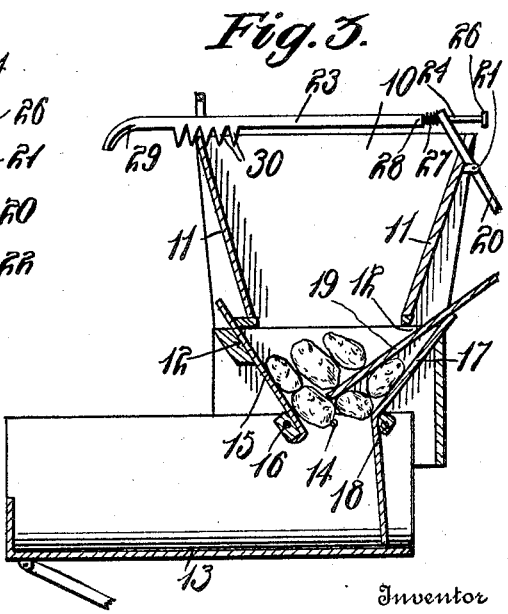
Inventor
T. J. Kelly.
Witnesses
W. E. Fielding
Francis Boyle
By 
Attorneys

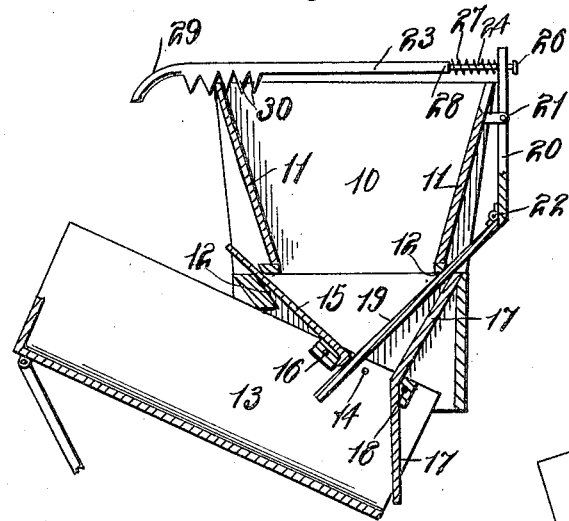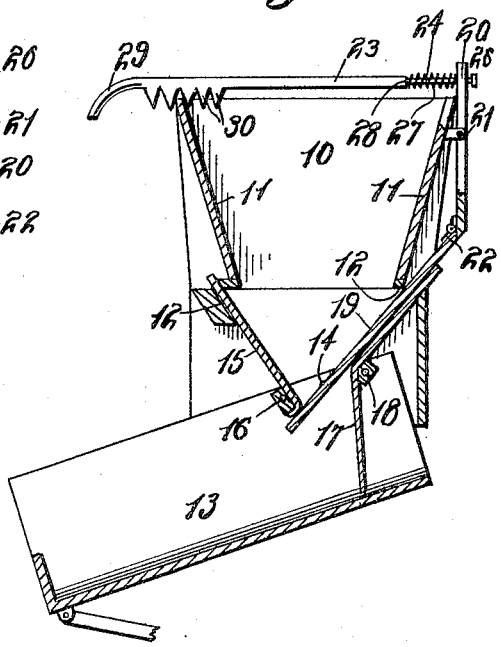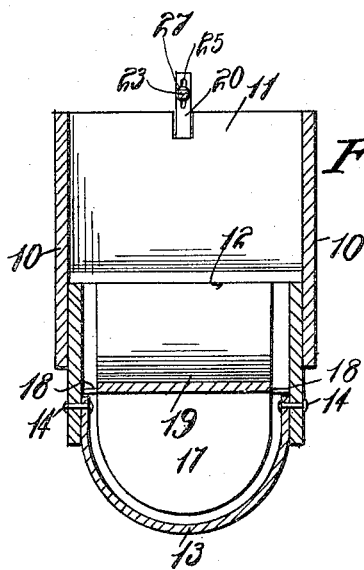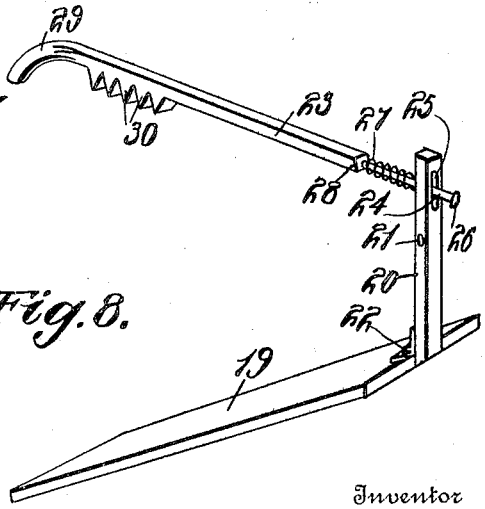

UNITED STATES PATENT OFFICE.

THOMAS J. KELLY, OF FOSSTON, MINNESOTA.

POTATO-PLANTER HOPPER.

1,075,040.

Specification of Letters Patent.  Patented Oct. 7, 1913.

Application filed December 12, 1912. Serial No. 736,363.

*To all whom it may concern:*

Be it known that I, THOMAS J. KELLY, a citizen of the United States, residing at Fosston, in the county of Polk, State of Minnesota, have invented certain new and useful Improvements in Potato-Planter Hoppers; and I do hereby declare the following to be a full, clear, and exact description of the invention, such as will enable others skilled in the art to which it appertains to make and use the same.

This invention relates to hoppers more particularly to that class of hoppers described in United States Letters Patent No. 956,583 issued to me on May 3rd, 1910.

An object of the present invention is to provide an improved cut-off valve for cutting off the discharge of potatoes to the shaker trough.

A further object of the invention is to provide improved agitators in the hopper and operated by the shaker trough to promote the discharge of potatoes to the trough.

With the above objects in view the invention consists of certain novel details of construction and combination of parts hereinafter fully described and claimed, it being understood that various modifications may be made in the minor details of construction within the scope of the appended claims.

In the accompanying drawings forming part of this specification:—Figure 1 is a side elevation of a hopper embodying my improvements. Fig. 2 is a longitudinal sectional view through the hopper with the valve closed. Fig. 3 is a longitudinal sectional view through the hopper showing the valve handle set and the shaker trough choked with potatoes. Fig. 4 is a plan view of the hopper. Fig. 5 is a longitudinal sectional view showing the agitator in the position assumed at one limit of vibratory movement of the shaker trough. Fig. 6 is a longitudinal sectional view showing the agitators in the position assumed at the other limit of vibratory movement of the shaker trough. Fig. 7 is a cross sectional view taken on the line 7—7 Fig. 1. Fig. 8 is a detail perspective view of the check valve and operating mechanism.

Referring now to the drawings in which like characters of reference designate similar parts, the hopper is shown to comprise side walls 10 and end walls 11, the latter being provided with cross slots 12 the purpose of which will presently appear. A shaker trough 13 is passed in between the side walls 10 and is pivoted to the latter through the instrumentality of alined pivot bolts 14. This trough is designed to be rocked on these pivot pins in any preferred manner. A substantially oblong sheet metal agitator 15 is provided at one end with gudgeons 16 which are journaled in the sides of the trough, the free ends of this agitator sloping upwardly and loosely projecting through the slot 12 in the adjacent end wall of the hopper. A second agitator 17 of substantially V-shaped longitudinal section is provided on the side edges with gudgeons 18 which are journaled in the sides of the trough on the opposite side of the pivots thereof from the first named agitator 15. The upper end of the agitator 17 is passed through the cross slot 12 of the adjacent end wall while the lower end of the agitator forms a closure for the intake end of the trough 13.

During upward movement of the free end of the trough the agitators assume the positions shown in Fig. 6 and permit of the potatoes gravitating into the trough. During downward movement of the free end of the trough the agitators assume the position shown in Fig. 5 and in this position of the parts it will be noted that the lower end of the agitator 17 has moved forwardly in the trough and thus performs the function of a kicker or follower to urge the potatoes along the trough. During the continued vibratory movement of the trough the angular positions of the agitators are constantly varying relatively to each other so that the potatoes are agitated within the hopper and their unobstructed discharge from the hopper promoted.

For shutting off the potatoes from the trough, an oblong sheet metal slide valve 19 is disposed upon the top face of the agitator 17, and projects loosely through the cross slot 12 that the agitator projects through. A rock lever 20 is pivoted intermediate its ends to the top edge of the hopper end wall by means of a pivot 21, and is hingedly connected at the lower end to the edge of the slide valve by means of a hinge 22. An operating lever 23 is provided with a reduced rod extension 24 which loosely passes through an opening 25 formed in the upper end of the rock link and is terminally headed up as shown at 26, there being a helical spring 27 on the rod between the rock link and shoulder 28 of the lever. The lever is formed on the bottom edge near the grip 29 with a series of notches 30. The lever extends longitudinally of the hopper and when thrust forwardly slides the slide valve to closed position, the latter being locked in this position by bringing one of the notches in the lever into engagement with the top edge of the underlying end wall of the hopper.

The value of the helical spring 26 is that when the shaker trough is clogged with potatoes and it is desired to close the slide valve, the operating lever may be thrust forwardly and locked as above described and during such movement of the parts the rod extension 26 will advance through the rock link with a resultant compression of the helical spring 27, the spring thereby exerting a constant pressure upon the upper end of the rock link and serving to move the rock link and close the slide valve as soon as the potatoes have been drawn out of compact mass by the vibratory movement of the shaker trough.

What is claimed, is:—

1. A hopper having opposite slots in the walls, a vibratory trough pivotally connected at one end to and registering with the bottom of said hopper, a pair of opposing downwardly inclined agitator plates pivotally connected to said trough and slidably fitting in said slots, and a cut-off valve slidably fitted in said hopper above said agitator plates.

2. The combination of a hopper, a cut-off valve slidably fitted in said hopper, a push rod extending longitudinally of said hopper and having notches in the lower edge adapted to engage with the top edge of one wall of said hopper, a rod extension on said push rod remote from said notches, a rock lever pivoted intermediate its ends on the top edge of the opposite end wall of said hopper, a pivotal connection between said slide valve and the lower end of said rock lever, said rod extension loosely fitting through an opening formed in the upper end of said rock lever, and a helical spring carried on the outer end of said rod extension and bearing against the outer face of said rock lever.

In testimony whereof, I affix my signature, in the presence of two witnesses.

THOMAS J. KELLY.

Witnesses:
  CHAS. L. CONGER,
  JOHN JOHNSON.

---

Copies of this patent may be obtained for five cents each, by addressing the "Commissioner of Patents, Washington, D. C."